July 10, 1923.
E. DICK
DYNAMO DRIVEN BY WHEEL AXLE
Filed Oct. 16, 1922
1,461,181
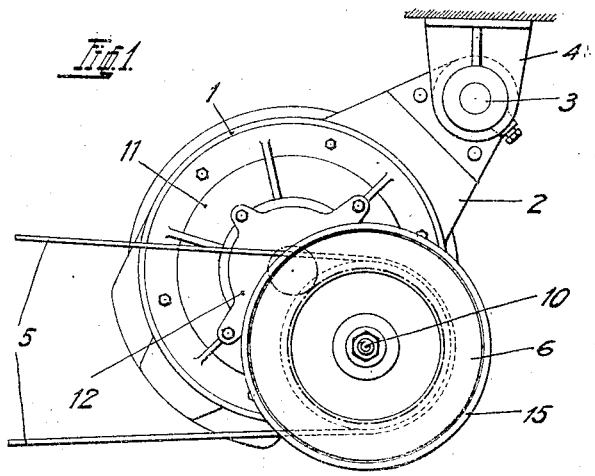
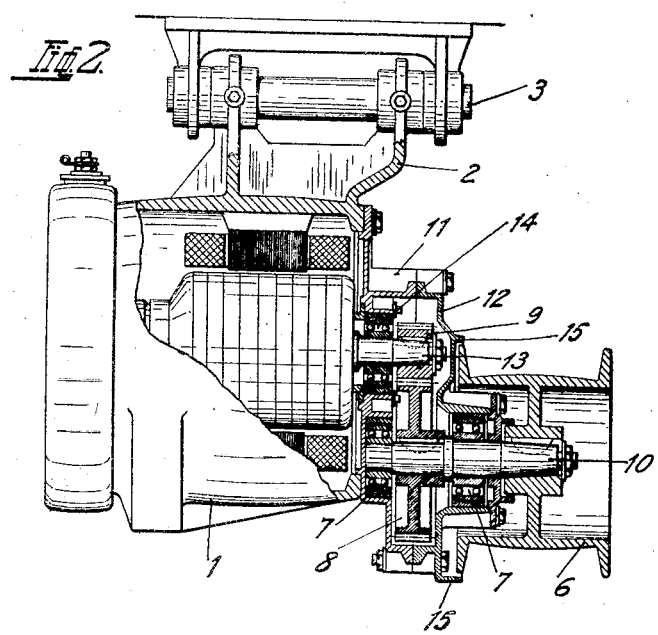
Inventor:
Emil Dick
By Alfred ...
Atty.

Patented July 10, 1923.

1,461,181

UNITED STATES PATENT OFFICE.

EMIL DICK, OF GENEVA, SWITZERLAND.

DYNAMO DRIVEN BY WHEEL AXLE.

Application filed October 16, 1922. Serial No. 594,751.

*To all whom it may concern:*

Be it known that I, EMIL DICK, a citizen of the Swiss Confederation, and residing at Geneva, Switzerland, have invented a certain new and useful Improvement in Dynamos Driven by Wheel Axles, of which the following is a specification.

This invention relates to dynamos that are mounted on vehicles and are driven by means of a driving member by a wheel-axle of the vehicle carrying them, and has for its main object to provide improved driving mechanism for the same.

To this end, according to the invention, a casing containing tooth-wheel gearing is arranged on that bearing-cover of the pivotally hung dynamo-casing which is situated at the driving-pulley end of the dynamo.

Other features of the invention will be described hereinafter and pointed out in the claims.

One embodiment of the invention is illustrated by way of example in the accompanying drawing, wherein:—

Figure 1 is an end elevation of a dynamo provided with one form of driving mechanism according to the invention, and Figure 2 is an elevation partly in section, in which the gear-case has been shifted through 90° from its position in Figure 1 in order to show the details more clearly.

Like reference numerals designate like parts in both views.

Referring to the drawing, the dynamo housing 1 is hung like a pendulum by means of a bracket 2 from shaft 3 carried in a bearing bracket 4 secured to the chassis or other convenient part of a vehicle, such as a railway-car. A belt 5 serves to drive the dynamo pulley 6 from a pulley, not shown, fast on a wheel-axle of the vehicle. The belt 5 is tensioned by the weight of the dynamo that hangs at an angle to the vertical, a spring being preferably used for aiding such tensioning.

The dynamo-pulley 6 which is provided with lateral flanges is fast on a shaft 10 that is journaled in two vertical bearings 7 and carries between the latter a gear-wheel 8 which meshes with a pinion 9. The mutually adjusting spherical bearings are illustrated as ball-bearings, but they may be in the form of roller-bearings or journal bearings constructed in such a manner that jamming of the bearings cannot occur. The outer bearing 7 is mounted in the outer part 12 of the two-part gear-case 11, 12 whereof the inner part 11 constitutes an end cover of the dynamo housing 1 and carries the inner bearing 7 of the countershaft 10. The pinion 9 is fast on the end of the dynamo shaft 13 which is journaled in two ball-bearings 14 whereof only one is illustrated. For assuring noiseless running the two gear-wheels 8, 9 are provided with precision skew teeth, but other kinds of gear-wheels such as those with double helical teeth may be used if desired. The gear-case completely encloses the two gear-wheels 8, 9 and the bearing 7 and one of the bearings 14 so that no foreign bodies can enter the same. For reducing the wear of the teeth and these bearings the interior of the gear-case is filled with a suitable lubricant, such as grease.

The cover plate 12 has cast on it a flange 15 that surrounds the one flange of the belt-pulley 6 for protecting it from foreign bodies, such as stones and the like, which fly up from the track at high speeds of the vehicle and under certain circumstances might lock the pulley to the gear-case against rotation.

The countershaft 10 is arranged in such a position that the line joining the centre of the countershaft 10 with the centre of the dynamo shaft 13 is about at a right angle with the line joining the axes of the dynamo shaft 13 and the suspension shaft 3. This arrangement has the advantage that, having regard to the small space available under vehicles such as railway-cars, the bracket 2 can be made as long as possible in order not only to utilize as fully as possible the weight of the dynamo for tightening the belt, but also to provide as long a path as possible for accommodating stretching of the belt. It is to be understood that instead of a belt some other form of driving members such as a rope, chain or the like may be employed.

I claim:—

1. In a dynamo having a housing arranged to be pivotally suspended from a support, the combination with the housing and the armature journaled therein, of a gear-case on the housing at one end thereof, a countershaft journaled in the gear-case and carrying a pulley outside the latter, and toothed-wheel gearing in said gear-case operatively connecting the countershaft with the armature shaft.

2. In a dynamo having a housing arranged to be pivotally suspened from a support, the combination with the housing and the armature journaled in end plates of the housing, of a gear-case constituted in part by one of said end plates, a countershaft journaled in the gear-case in mutually adjustable bearings, and carrying a pulley outside the case, and toothed-wheel gearing in said gear-case operatively connecting the countershaft with the armature shaft.

3. In a dynamo having a housing arranged to be pivotally suspended from a support, the combination with the housing and the armature journaled therein, of a gear-case on the housing at one end thereof, a countershaft journaled in the gear-case and carrying a pulley outside the latter, and toothed-wheel gearing in said gear-case operatively connecting the countershaft with the armature shaft, said gear-case having a guard for the pulley on the side of the case nearest the pulley.

4. In a dynamo having a housing provided with a bracket arranged to swing about an axis parallel with the axis of the armature, the combination with the housing and the armature journaled therein, of a gear-case on the housing at one end thereof into which the armature shaft extends, a countershaft journaled in the gear-case, a pulley fast on the countershaft outside the gear-case, and toothed-wheel gearing in the gear-case operatively connecting the countershaft with the armature shaft, the axis of said countershaft being located outside the plane containing the aforesaid axes.

5. In a dynamo having a housing, arranged to be pivotally suspended from a support the combination with the housing and the armature journaled therein, of a gear-case on the housing at one end thereof into which the armature shaft extends, a countershaft journaled in the gear-case, a pulley fast on the countershaft outside the gear-case, and gearing comprising skew gear-wheels meshing one with another operatively connecting the countershaft with the armature shaft.

In testimony whereof, I affix my signature in the presence of two witnesses.

EMIL DICK.

Witnesses:
HUGO SCHERER,
BANDELING.